Patented Oct. 14, 1952

2,614,046

UNITED STATES PATENT OFFICE 2,614,046

METHOD OF ENHANCING THE WHIPPING PROPERTIES OF EGG ALBUMEN SOLUTIONS AND WHIPPABLE EGG ALBUMEN COMPOSITIONS

Sanford Joseph Werbin, New York, N. Y., assignor to Stein, Hall & Company, Inc., New York, N. Y., a corporation of New York No Drawing. Application April 1, 1950, Serial No. 153,499

7 Claims. (Cl. 99—113)

My present invention relates generally to the whipping of raw egg white, and of other solutions containing egg albumen as the main whippable ingredient, and has particular reference to the enhancement of the whipping properties of such solutions.

In the preparation of certain aerated products, notably food products such as meringues, angel cakes, pie fillings and pie toppings, the desired fluffiness and loose structure are commonly produced by the employment of egg albumen, which is adapted in aqueous solution to form an aerated foam or whip.

Certain acid salts are known to have the property of accelerating and improving the quality of such a whip, and in commercial practice small quantities of these salts, either singly or in combinations, are customarily added to the solutions to be whipped. The salts most commonly used are potassum acid tartrate (cream of tartar), sodium aluminum sulphate (alum), and mono-calcium phosphate.

The present invention is predicated upon the discovery that sodium diacetate is a chemical compound which has certain properties that make it unusually effective to enhance the whipping properties of egg albumen. When it is added in relatively small amounts to raw egg white or other aqueous egg albumen solution, a whip can be produced that is faster developing, larger in volume, stiffer, and more stable than that which would result from the solution itself or when aided by any of the usual accelerators hereinbefore mentioned. Moreover, these desirable results can be achieved with less concentration of egg albumen in the solution, and with consequent greater economy; and no undesirable acid taste is imparted to the whip.

Sodium diacetate is a complex acetate containing combined but undissociated acetic acid. It is available in the convenient form of a dry crystalline powder, and in a 10% solution it has a pH of from 4.5 to 4.9. Experiments have shown that its effectivenes as a whipping aid is probably due to its acetic acid content and to its high acetic acid reserve acidity. I have found that the addition of ordinary glacial acetic acid to an egg albumen solution produces an undesirable sourness and is in other respects unsuitable for commercial practice, but that it is nevertheless conducive to the formation of a quick whip of relatively large volume and high stability. It is my belief that the advantages of sodium diacetate arise from the fact that, when used in the proportions herein specified, it makes undissociated acetic acid molecules available in sufficient abundance to achieve the desired whip enchancement, under conditions wherein the acid can manifest its desirable properties without at the same time evidencing any of the objectionable sourness.

Another advantage of the sodium diacetate lies in the fact that it is entirely compatible with the known whipping accelerators referred to, and can be used, if desired, in any intermixture with one or more of them.

These advantages of sodium diacetate are illustrated by the following tabulation of the results of a series of comparative experiments. In each case, a typical commercial meringue solution was formed, consisting of 5 grams of dried egg albumen and 160 grams of sugar dissolved in 133 c. c. of water. In the "control" experiment, no further ingredients were aded. In each of the other experiments 0.7 gram of the designated whipping aid was dissolved in the solution. Beating was carried out for five minutes in a high-speed mechanical beater, viz., a standard Hobart beater using a 10-quart bowl and operating at high speed. The "bleed" was the volume of clear liquid that reformed, as a result of foam collapse, upon standing overnight. A low "bleed" thus serves as an indication of high whip stability.

|  | Whip volume | pH of whip | Bleed |
|---|---|---|---|
|  | Cc. |  | Cc. |
| Control solution | 1,000 | 5.23 | 35 |
| With alum | 1,200 | 4.78 | 27 |
| With mono-calcium phosphate | 1,300 | 4.98 | 40 |
| With cream of tartar | 1,300 | 4.64 | 23 |
| With sodium diacetate (Example I) | 1,600 | 5.12 | 10 |

Similar results were achieved when whole egg white was used:

Example II

| | |
|---|---|
| Whole egg white | grams__ 35 |
| Sugar | do____ 160 |
| Sodium diacetate | do____ 1.75 |
| Water | c. c.__ 103 |

After whipping this solution for 10 minutes at high speed, a whip resulted that had a volume of 1650 c. c. and whose pH was 4.98. The "bleed," on standing overnight, was only 13 c. c.

Other examples of how sodium diacetate can serve as a beneficial and unusually effective whipping aid, in solutions wherein the main whippable ingredient is egg albumen, are:

Example III

To produce an angel cake, the following ingredients were employed (all parts by weight):

| | |
|---|---|
| Whole egg white | 236.00 |
| Salt (sodium chloride) | 1.65 |
| Sugar | 224.00 |
| Flour | 84.00 |
| Sodium diacetate | 3.25 |

The egg white, with the salt added, was first beaten lightly for about half a minute. Then the sodium diacetate was added, after having been previously blended with half of the sugar. The resultant solution was then beaten at high speed to the desired whipped state. The flour and the balance of the sugar were blended and folded in. For an average size cake, baking was at 375° F. for about 20 minutes. The cake showed improved volume, texture, and keeping qualities as compared with other cakes prepared in exactly the same way except that cream of tartar, tartaric acid, or mixtures of these whipping aids, were used in place of sodium diacetate.

If desired, the sodium diacetate can be used alone, as above indicated, or it can be mixed with one or more other accelerators. For instance, in the example given, a replacement of the—

Sodium diacetate _____parts__ 3.25 with a mixture of—

|   | Parts |
|---|---|
| Sodium diacetate | 2.65 |
| and Tartaric acid | 0.30 | proved to be equally beneficial to the resultant whip.

*Example IV*

A cheese cake was produced by first making a batter of the following ingredients (all parts by weight):

|   | Parts |
|---|---|
| Bakers' cheese | 354. |
| Flour | 136. |
| Shortening | 65. |
| Whole egg yolk | 131. |
| Milk | 125. |
| Salt (sodium chloride) | 2.5 |
| Sugar | 74. |
| Vanilla | 3. |

Separately beaten at high speed to the desired stiffness, then folded in, was a solution composed of:

|   | Parts |
|---|---|
| Whole egg white | 359. |
| Sugar | 74. |
| Sodium diacetate | 4.5 |

Baking was at 225° F. for about 2 hours. The resultant cake had a greater volume, better keeping qualities, and an improved texture and tenderness as compared with other cakes prepared in exactly the same way but using whipping aids other than sodium diacetate.

In the foregoing examples, for each 100 parts of egg albumen (measured as a dry ingredient) there are from about 9 parts (Example IV) to about 35 parts (Example II) of sodium diacetate. Generally speaking, it has been found that optimum results are achieved when the sodium diacetate is present in an amount between 5% and 40% of the egg albumen (measured in dry state). In a series of experiments with a base solution formed by dissolving 5 grams of egg albumen and 160 grams of sugar in 133 c. c. of water, it was found that adding to the solution less than 0.25 grams of sodium diacetate (5%) did not materially increase the volume of whip produced. When the diacetate addition was between 20% and 30% of the egg albumen, the volume of whip increased materially and the whip had a stiffness and stability of excellent character. Up to 40% there was no further increase in whip volume nor any material reduction in "bleed." After 45% the whip volumes actually declined and an undesirable sour taste manifested itself.

Similar results were obtained when varying quantities of sodium diacetate were added to a base solution formed by dissolving 35 grams of raw liquid egg white and 160 grams of sugar in 103 c. c. of water. Optimum effects were noted when about 1.75 grams of sodium diacetate was added (about 5.% of the whole egg white, and about 35.% of the egg albumen measured as a dry ingredient).

In commercial usage, the invention may be practiced in various ways. The sodium diacetate need not necessarily be added as a separate ingredient to the solution to be whipped. It can be mixed and blended, in advance, either alone or in combination with other known whipping aids, with other dry ingredients of the product ultimately to be produced. For example, the sodium diacetate might be mixed with dried egg albumen, along with desired inert materials such as sugar, starch, flour, cheese, flavoring, etc., and the mixture may be shipped and stored as a dry product that can, at any subsequent time, be dissolved in water and whipped to form a meringue or similar product. A typical "meringue powder" of this kind has a formula somewhat as follows (minute amount of vanillin or other flavoring being omitted):

*Example V*

|   | Per cent |
|---|---|
| Dry egg albumen | 20.0 |
| Sodium diacetate | 3.0 |
| Powdered corn starch | 38.0 |
| Powdered cane sugar | 39.0 |

When such a prepared powder is to be used, about 20 ounces are blended with 10 pounds of cane sugar, and this mixture is dissolved in 1 gallon of water, the solution then beaten at high speed until the desired whip is attained. The resultant meringue is stiff and stable. It can be blended with whipped cream to extend and stabilize the latter; it can be blended with pie fillings to form light "chiffon" fillings; it can be used as a pie topping; and it has many other uses about the bakery.

In meringue powders heretofore in common use, embodying whipping aids consisting only of salts other than sodium diacetate, it is necessary to use more than 20% of the dry egg albumen, often as much as 30%, to obtain a whip whose volume and other desirable properties are equivalent to the whip resulting from the powder illustratively described in Example V.

As a further illustration of the compatibility of sodium diacetate with other whipping aids commonly used, the following "meringue powder" has the same advantageous properties as that of Example V:

*Example VI*

|   | Per cent |
|---|---|
| Dry egg albumen | 20.0 |
| Sodium diacetate | 1.7 |
| Cream of tartar | 1.5 |
| Alum | 1.5 |
| Powdered corn starch | 38.0 |
| Powdered cane sugar | 37.3 |
|   | 100.0 |

(Plus flavoring to taste)

This prepared powder, when used, is usually blended with sugar in the proportion of about 20 ounces of the powder to about 10 pounds of cane sugar, the mixture being dissolved in about 1 gallon of water, then whipped.

In general, it has been found in all cases that the use of sodium diacetate as a whipping aid speeds up the foaming procedure and produces a whip having a relatively high pH, whose flavor is unimpaired by the added ingredient, and which is more voluminous, more stable, and stiffer than the whip that would have been produced without the sodium diacetate, or using only known whipping aids other than sodium diacetate.

Except as otherwise specified herein and in the appended claims, the details set forth may obviously be varied in practice, by those skilled in the art, without necessarily departing from the spirit and scope of the invention as expressed in the claims.

Having thus described my invention and illustrated its use, what I claim as new and desire to secure by Letters Patent is:

1. A dry composition of matter adapted to be dissolved in an aqueous medium to form a whippable product, said composition containing egg albumen as its main whippable ingredient and a relatively small quantity of sodium diacetate.

2. A dry composition of matter adapted to be dissolved in an aqueous medium to form a whippable product, said composition containing egg albumen as its main whippable ingredient and a relatively small quantity of sodium diacetate, there being present from five to forty parts of the sodium diacetate for each one hundred parts of the egg albumen.

3. A composition of matter adapted to enhance the whipping properties of an aqueous solution containing egg albumen as its main whippable ingredient, said composition consisting of sodium diacetate and at least one of the group of whipping accelerators which consists of cream of tartar, tartaric acid, alum, and mono-calcium-phosphate.

4. A meringue powder composed of dried egg albumen, sodium diacetate, and inert filler, said powder being soluble in an aqueous medium to form a whippable solution whose main whippable ingredient is egg albumen.

5. A whippable food composition comprising an aqueous solution of edible ingredients containing egg albumen as the predominant whippable ingredient, and sodium diacetate in an amount sufficient to manifest its whip enhancing properties.

6. The method of enhancing the whipping properties of an aqueous solution containing egg albumen as the main whippable ingredient, which comprises incorporating sodium diacetate into the solution prior to whipping and in an amount sufficient to manifest its whip enhancing properties.

7. The method of enhancing the whipping properties of an aqueous solution containing egg albumen as the main whippable ingredient, which comprises incorporating sodium diacetate into the solution prior to whipping and in an amount which consists of five to forty parts of sodium diacetate for each one hundred parts of the egg albumen measured in dry state.

SANFORD JOSEPH WERBIN.

REFERENCES CITED

The following references are of record in the file of this patent:

UNITED STATES PATENTS

| Number | Name | Date |
|---|---|---|
| 2,059,399 | Rosner | Nov. 3, 1936 |
| 2,166,070 | Littlefield | July 11, 1939 |
| 2,243,867 | Katzman | June 3, 1941 |
| 2,271,756 | Bauer et al. | Feb. 3, 1942 |

FOREIGN PATENTS

| Number | Country | Date |
|---|---|---|
| 543,582 | Great Britain | Mar. 4, 1942 |